Feb. 22, 1966   R. C. ADAMS   3,235,953
METHOD OF ASSEMBLING STEERING GEAR
Original Filed March 17, 1961   2 Sheets-Sheet 1
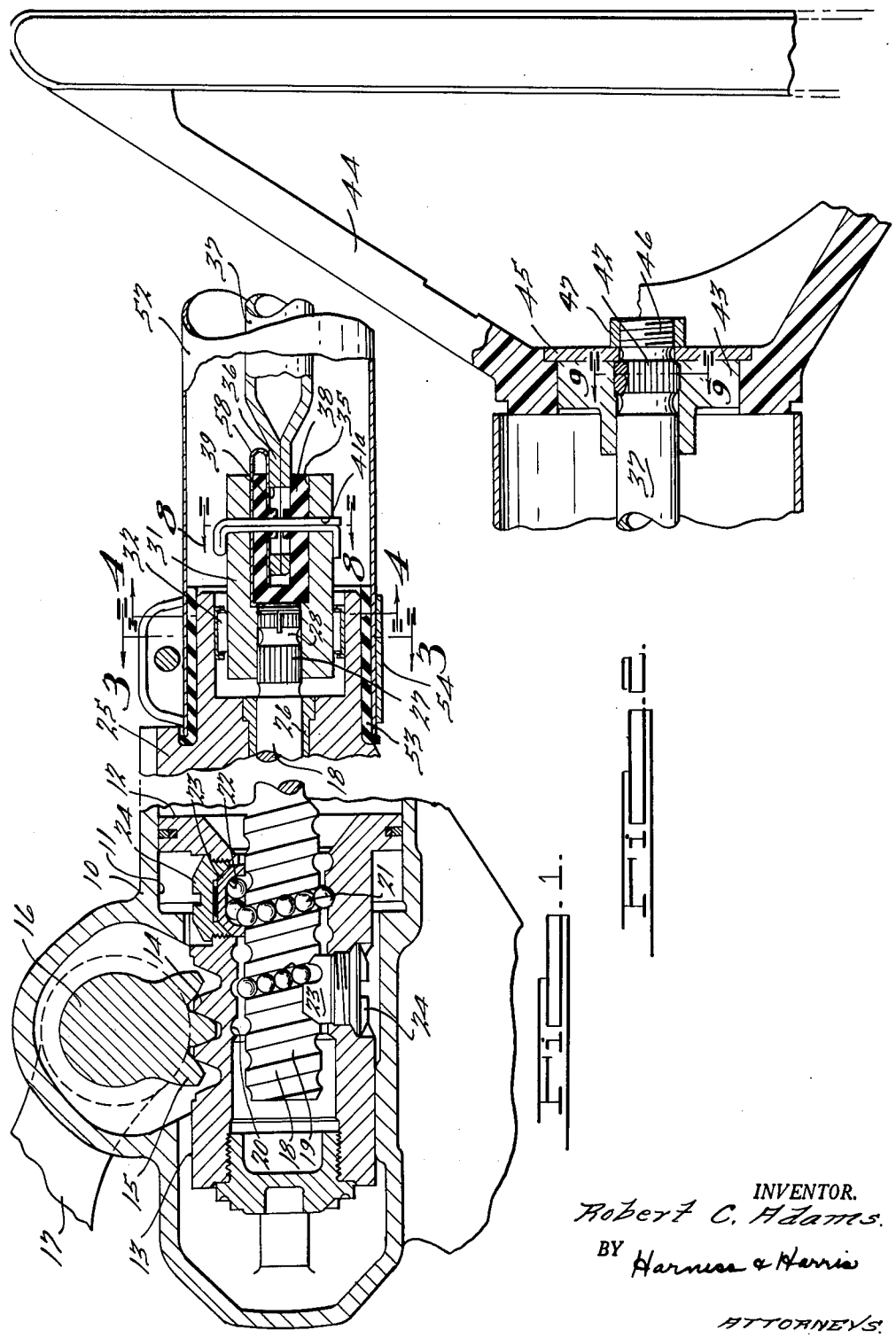
INVENTOR.
Robert C. Adams.
BY Harness & Harris
ATTORNEYS.

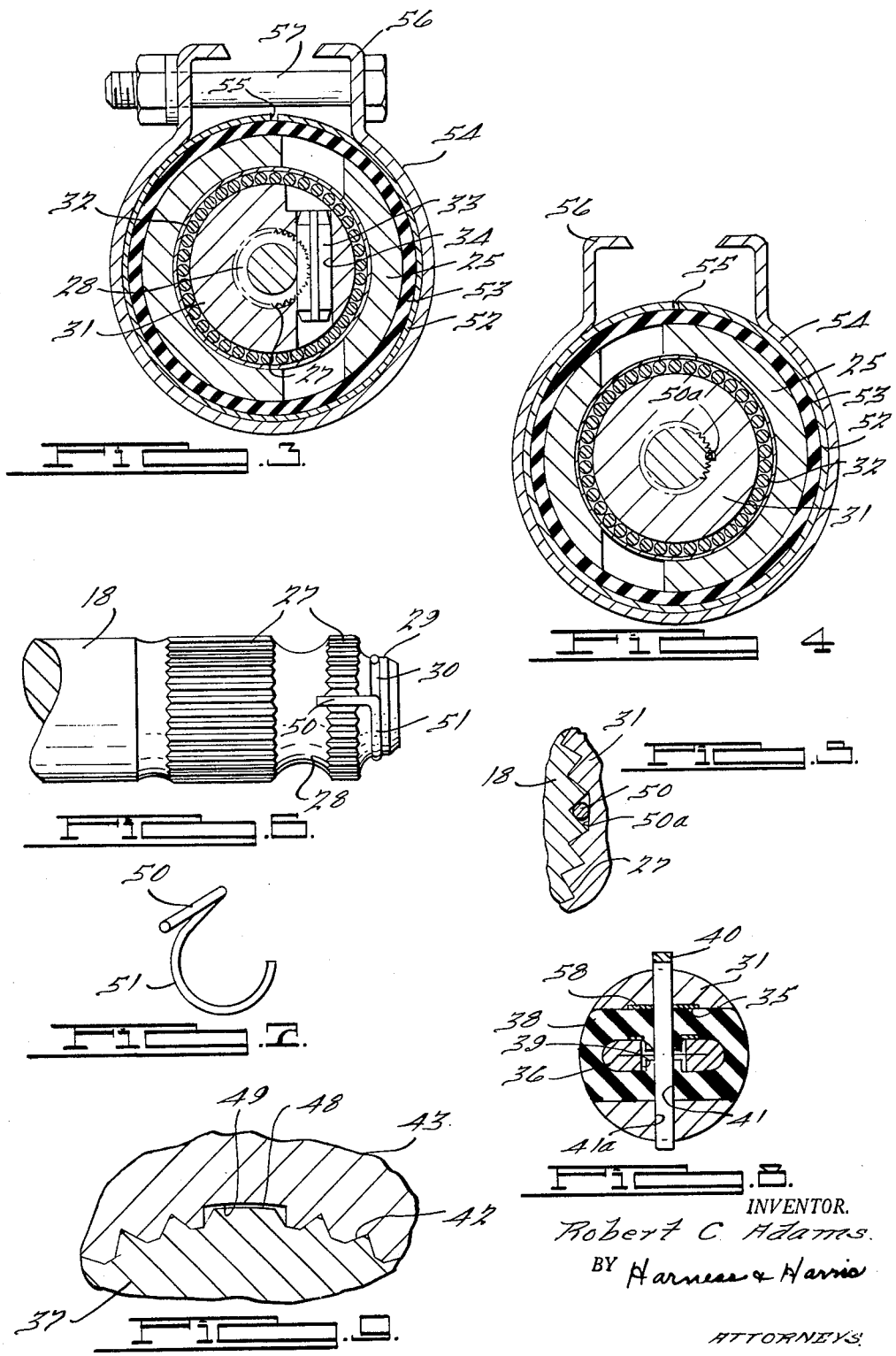

United States Patent Office 3,235,953
Patented Feb. 22, 1966

1

3,235,953
METHOD OF ASSEMBLING STEERING GEAR
Robert C. Adams, Royal Oak, Mich., assignor to Chrysler Corporation, Highland Park, Mich., a corporation of Delaware
Original application Mar. 17, 1961, Ser. No. 96,472. Divided and this application Jan. 18, 1965, Ser. No. 429,195
3 Claims. (Cl. 29—407)

This invention relates to a method of assembling a vehicle steering and has the important object of providing an improved method of assembling a worm shaft of a power steering gear and a manually operated steering shaft. This application is a division of my co-pending application, Serial Number 96,472, filed March 17, 1961, now abandoned.

In one conventional steering gear, a worm shaft is connected coaxially with a manually actuated steering shaft to be rotated thereby. The worm shaft is also operably connected with a fluid actuated piston which affords a power assist to the manual steering effort, the piston in turn being connected by means of a gear rack with a sector gear which is operably connected by means of a steering linkage with the dirigible wheels of the vehicle to steer the same.

During assembly of the vehicle, it is desirable that the sector gear and connected worm shaft be located at a predetermined steering position, as for example for steering straight ahead, and then connected with the manual steering shaft assembly which is correspondingly arranged for steering straight ahead. The predetermined alignment between the worm and steering shafts is accomplished by providing interfitting master spline portions on these shafts such that they can be assembled only in one position of alignment with respect to each other.

Because of the stack-up of tolerances in the several parts connecting the worm shaft and sector gear, it was not feasible heretofore to form a master spline in the worm shaft until after the same was assembled with the sector gear and power piston. Then the master spline was broached in the worm shaft at a predetermined location so as to align properly with the mating master spline portion in the steering shaft. This method has been costly and runs the danger of getting metal chips in the assembled gear.

Another object is therefore to provide a simple and improved method of assembling a steering gear utilizing an adjustable spline wherein the gear assembly comprising the worm shaft and connected sector gear are feasibly and economically assembled as a unit separate from the steering shaft assembly, the adjustable spline being suitably assembled in adjusted position so as to assure proper alignment between the worm and steering shafts when these are assembled together in the automobile.

Other objects of this invention will appear in the following description and appended claims, reference being had to the accompanying drawings forming a part of this specification wherein like reference characters designate corresponding parts in the several views.

FIGURE 1 is a fragmentary mid-sectional view seen from above of a power steering gear constructed in accordance with the present invention;

FIGURE 2 is a fragmentary mid-sectional view showing the upper end of the manual steering shaft rotated 90° from the position shown in FIGURE 1;

FIGURE 3 is an enlarged sectional view taken in the direction of the arrows 3—3 of FIGURE 1;

FIGURE 4 is an enlarged sectional view taken in the direction of the arrows 4—4 of FIGURE 1;

FIGURE 5 is an enlarged fragmentary view of the adjustable spline element and master spline-receiving recess of FIGURE 4;

FIGURE 6 is an enlarged view of the splined end of the worm shaft illustrated in FIGURE 1;

FIGURE 7 is a view of the spline element removed from the worm shaft of FIGURE 6;

FIGURE 8 is a fragmentary enlarged view taken in the direction of the arrows 8—8 of FIGURE 1; and FIGURE 9 is an enlarged view taken in the direction of the arrows 9—9 of FIGURE 2.

It is to be understood that the invention is not limited in its application to the details of construction and arrangement of parts illustrated in the accompanying drawings since the invention is capable of other embodiments and of being practiced or carried out in various ways. Also it is to be understood that the phraseology or terminology employed herein is for the purpose of description and not of limitation.

Referring to the drawings, a power steering gear constructed in accordance with the present invention and suitable for automotive use is illustrated by way of example comprising a housing 10 having a cylindrical portion 11 containing a reciprocable fluid actuated piston 12. Extending leftward from the piston 12 is a coaxial integral tubular extension 13 having a plurality of outwardly directed gear rack teeth 14 in mesh with the teeth 15 of a sector gear 16. The latter is suitably mounted within the housing 10 and is keyed to a pitman 17 which in turn is connected with the vehicle steering linkage to effect steering movement in accordance with reciprocation of piston 12.

A helical cam or worm shaft 18 extends coaxially through piston 12 and into the tubular extension 13. The shaft 18 is provided with an outer helical groove 19 which mates with an internal helical groove 20 formed in the bore of extension 13 to provide a helical passage for a plurality of balls 21. In the present instance two separate sets of balls 21, each set comprising substantially a single helical turn, are provided to interconnect the worm 18 and extension 13. In order to enable continuous recirculation of each set of balls 21 within its respective single helical turn, the balls 21 of each set are conducted over the land of the worm 18 by means of a transfer port 22 within a ball guide 23 secured within a radial opening in extension 13 by a cap nut 24.

Upon manual rotation of shaft 18, the ball coupling elements 21 impart axial movement to extension 13 so as to swing sector gear 16 in the steering movement. Suitable valving means may be employed in accordance with conventional practice to direct pressurized hydraulic fluid into cylinder 11 at one side or the other of piston 12 to provide a power assist to the manual steering effort. This concept and the structure thus far described may be conventional and are accordingly not discussed in further detail.

Shaft 18 extends coaxially to the right from chamber 11 into a housing portion 25 which is suitably secured to housing 10. Within housing 25, shaft 18 provides a smooth bearing portion journalled within a sleeve bushing 26 and terminates in a spline end 27 comprising a plurality of axially extending serrations uniformly spaced circumferentially around the outer surface of the end of shaft 18, FIGURE 6. The serrations 27 are partitioned into two parts by an annular pin-receiving groove 28 formed coaxially in the outer surface of shaft 18. To the right of the serrations 27, the shaft 18 is reduced in diameter at 29 and is provided with a coaxial outwardly opening groove 30 in its outer surface.

A tubular coupling 31 journalled by means of needle bearings 32 within a cylindrical portion of housing 25 is provided with an internal set of spline serrations mating and interfitting with the serrations 27. A retaining pin 33 snugly contained within an offcenter bore 34 in coupling 31, FIGURE 3, engages shaft 18 within groove 28 to prevent relative axial movement between the latter and coupling 31. Accordingly the coupling is adjustably secured to shaft 18 for both rotational and axial movement therewith.

The right end of coupling 31 is provided with a diametrically extending slot 35 which contains the flattened end or spade 36 of a tubular manually operated steering shaft 37. A rubber sheath 38 closely confines the spade 36 and snugly fills the space between the latter and coupling 31, FIGURE 8. In order to provide for relative axial adjustment between steering shaft 37 and coupling 31 to facilitate assembly, the spade 36 is provided with an oversized slot 39 for a retaining pin or cotter key 40 which extends freely through slot 39 and is closely confined within holes 41 and 41a in the sheath 38 and coupling 31 respectively.

In accordance with the structure described, a positive connection between shaft 37 and coupling 31 is provided whereby limited angular movement of shaft 37 is resiliently enabled in any direction with respect to the axis of shaft 18 to accommodate mechanical torsion and to facilitate assembly. Rotation of shaft 37 imparts rotation to coupling 31 and thus to worm shaft 18 to actuate the steering movement as aforesaid.

The right or upper end of shaft 37 is provided with a plurality of circumferentially extending spline serrations 42 similar to the serrations 27 and interfitting with mating internal spline serrations of the hub 43 of a steering wheel 44, the hub 43 and steering wheel 44 being suitably secured together for rotation as a unit. A washer 45 fitting over a reduced threaded end 46 of shaft 37 and seated tightly against the hub 43 is retained in place by means of nut 47 screwed on the end 46 to hold the steering wheel assembly 43, 44 in position on shaft 37.

As in the case of the spline serrations 27, the serrations 42 are uniformly spaced circumferentially and are all of identical size, except that at one predetermined location on shaft 37 a master spline 48 is provided which extends circumferentially the space of two of the normal serrations 42, FIGURE 9. Correspondingly, a master spline-receiving recess 49 is provided at a predetermined location in hub 43 to snugly receive the master spline 48.

It is apparent from the structure of the connection between the coupling 31 and spade 36 that the latter may be selectively interfitted with the coupling 31 at each of two angular positions 180° apart. The master spline 48 is provided at a predetermined fixed angular position with respect to the spade 36, so that when the latter is in a vertical position for example, the master spline 48 will be at the uppermost position of the cylindrical surface of shaft 37. The steering wheel 44 is thus designed with respect to its hub 43 and master spline-receiving recess 49 so that when the shaft 37 is arranged with master spline 48 in the upper position illustrated in FIGURE 2, the steering wheel 44 can be assembled on shaft 37 in only one position whereat its spokes, emblems, and ornamentation will be in the desired upright position for straight ahead steering.

In order to assure that the steering gear mechanism within housing 10 will also be at the straight ahead steering position when assembled with shaft 37, an adjustable spline element 50 is formed from resilient wire stock with an outer loop portion 51 adapted to snap removably into groove 30 and be resiliently confined therein with the element 50 located between a successive pair of the serrations 27. Accordingly the gear including pitman 17, sector 16, rack 13, and shaft 18 are adjusted to the neutral position for straight ahead steering. Thereafter the spline element 50 is inserted between a pair of the spline serrations 27 at a predetermined location, as for example so that element 50 will be at the top of worm shaft 18.

In order to mate with the element 50, the internal spline serrations formed within coupling 31, FIGURE 5, are provided with a master spline-receiving recess 50a having a circumferential extent equal to the circumferential spacing of two successive serrations of the spline 27. In other respects, the internal serrations of the coupling 31 are formed to match closely with the serrations 27, so that when spline element 50 is not employed, the shaft 18 can be interconnected with coupling 31 at a plurality of angular positions of adjustment. By providing the master spline-receiving recess 50a in diametrical alignment with the slot 35, the latter must be assembled in vertical alignment when the spline element 50 is assembled between successive spline serrations 27 at the top of the shaft 18 as illustrated in FIGURE 5.

The steering shaft 37 is rotatably mounted within a fixed tubular column 52 by means not shown, the lower end of column 52 fitting over an annular rubber bushing 53 around an extension of housing 25. A clamp ring 54 extends around the lower end of column 52, which is provided with a saw slot 55 at the region of the rubber ring 53, and terminates in a pair of generally radially extending arms 56 which are drawn together in a clamping action by a bolt 57, thereby to restrict the slot 55 and snugly clamp the lower end of column 52 to housing 25. A copper or brass horn ground element 58 is illustrated in FIGURE 1 extending above and below portions of the resilient sheath 38 in position to make electrical contact between coupling 31 and spade 36. Thus the steering column 37 may be employed as part of the electrical circuit for the horn mounted on the steering column.

In accordance with the structure described, the steering gear assembly within housing 10 can be assembled on a bench as a unit distinct from the steering shaft 37. Thus the assembled gear, including sector gear 16 and worm 18 will be adjusted to the straight ahead steering position and the spline element 50 will be inserted between the uppermost serrations 27. Thereafter when the aforesaid gear unit is assembled in the car, the splined end of shaft 18 will interfit with coupling 31 in only one position of adjustment whereat the slot 35 of the latter will be in a vertical position to receive the spade 36 of shaft 37. During the latter assembly, the mechanic need only ascertain that the master spline 48 is also in the uppermost position to assure that when the steering wheel assembly 43, 44 are assembled, the latter will be in their desired relative angular position.

I claim:

1. In the method of assembling a steering gear comprising a power unit having a rotatable camshaft in a housing, a manually rotatable steering shaft having a flattened end, and a flexible coupling for connecting said cam and steering shafts for rotation as a unit, said coupling having a tubular portion at one end adapted to be sleeved over an end of said camshaft and a portion having a diametrical slot at the other end adapted to receive said flattened end, the exterior of said camshaft and the interior of said tubular coupling portion having a plurality of circumferentially spaced splines adapted to interfit in splined relationship at a plurality of positions of relative angular adjustment of said camshaft and coupling, the splines of said coupling providing a master spline-receiving recess adapted to receive a pair of successive splines of said camshaft and a spline element interposed between said pair of successive splines, the steps of providing such a spline element adapted to be removably secured in the space between a pair of successive splines of said camshaft to block entry of any one of the splines of said coupling into said space, holding said housing in a predetermined position, assembling said power unit and camshaft within said housing at a predetermined angular position with respect to said housing, securing said spline element in the space between a pair of successive splines of said camshaft at a predetermined angular position with respect to said housing, adjusting said steering shaft and coupling to predetermined angular positions with respect to said housing, and thereafter interfitting said spline element and pair of successive splines into said master spline-receiving recess.

2. In the method of manufacturing and assembling a power steering gear in an automobile, the steps of providing a steering gear comprising a power unit having a rotatable camshaft in a housing, providing a manually rotatable steering shaft having a flattened end, providing a coupling for connecting said cam and steering shafts for rotation as a unit, said coupling being formed with a tubular portion at one end adapted to be sleeved over an end of said camshaft and also being formed with a diametrical slot in its other end adapted to receive said flattened end, the exterior of said camshaft and the interior of said tubular coupling portion being formed with a plurality of circumferentially spaced splines adapted to interfit in splined relationship at a plurality of positions of relative angular adjustment of said camshaft and coupling, the splines of said coupling being formed to provide a master spline-receiving recess adapted to receive a pair of successive splines of said camshaft and a spline element interposed between said pair of successive splines, providing such a spline element adapted to be removably secured in the space between a pair of successive splines of said camshaft to block entry of any one of the splines of said coupling into said space, adjusting said power unit and camshaft to a predetermined angular relationship with respect to said housing, securing said spline element in the space between a pair of successive splines of said camshaft at a predetermined angular position with respect to said housing, installing said housing and coupling in said automobile with said spline element and pair of successive splines interfitting in said master spline-receiving recess, and thereafter installing said shaft in said automobile with said flattened end within said slot.

3. In the method according to claim 2, forming said shaft with a master spline at its end opposite said flattened end and located in predetermined angular relationship with respect to said flattened end, whereby the last named master spline is maintained in predetermined spatial relationship with said flattened end installed within said slot.

References Cited by the Examiner
UNITED STATES PATENTS

| | | | |
|---|---|---|---|
| 2,576,298 | 11/1951 | Kessler | 151—23 X |
| 2,773,396 | 12/1956 | Haynes et al. | 74—388 |
| 2,839,902 | 6/1958 | Glover | 64—6 |

WHITMORE A. WILTZ, *Primary Examiner.*